US007003551B2

(12) United States Patent
Malik

(10) Patent No.: US 7,003,551 B2
(45) Date of Patent: Feb. 21, 2006

(54) METHOD AND APPARATUS FOR MINIMIZING STORAGE OF COMMON ATTACHMENT FILES IN AN E-MAIL COMMUNICATIONS SERVER

(75) Inventor: Dale W. Malik, Dunwoody, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 795 days.

(21) Appl. No.: 09/725,719

(22) Filed: Nov. 30, 2000

(65) Prior Publication Data
US 2002/0065892 A1 May 30, 2002

(51) Int. Cl.
G06F 15/16 (2006.01)

(52) U.S. Cl. ........................................ 709/206; 709/232
(58) Field of Classification Search ................ 709/217, 709/206, 232, 200, 203, 226, 218, 219, 201; 370/238; 455/524; 358/402; 713/201; 705/14; 707/200, 3, 101, 204; 710/33; 715/500, 513, 826; 717/141; 379/93
See application file for complete search history.

(56) References Cited

U.S. PATENT DOCUMENTS

| | | | | |
|---|---|---|---|---|
| 5,323,394 A * | 6/1994 | Perlman | ...................... | 370/238 |
| 5,327,534 A * | 7/1994 | Hutchison et al. | .......... | 709/226 |
| 5,379,448 A * | 1/1995 | Ames et al. | ................. | 455/524 |
| 5,771,355 A * | 6/1998 | Kuzma | ........................ | 709/232 |
| 5,778,395 A * | 7/1998 | Whiting et al. | ............. | 707/204 |
| 5,781,901 A | 7/1998 | Kuzma | ......................... | 707/10 |
| 5,809,481 A * | 9/1998 | Baron et al. | ................... | 705/14 |
| 5,832,208 A * | 11/1998 | Chen et al. | .................. | 713/201 |
| 5,892,909 A * | 4/1999 | Grasso et al. | ................ | 709/201 |
| 5,903,723 A * | 5/1999 | Beck et al. | .................. | 709/200 |
| 5,905,712 A * | 5/1999 | Cresswell et al. | .......... | 370/238 |
| 5,937,160 A * | 8/1999 | Davis et al. | ................. | 709/203 |
| 6,009,462 A * | 12/1999 | Birrell et al. | ................ | 709/206 |
| 6,021,433 A * | 2/2000 | Payne et al. | ................. | 709/219 |
| 6,035,104 A * | 3/2000 | Zahariev | ...................... | 709/203 |
| 6,035,121 A * | 3/2000 | Chiu et al. | ................... | 717/141 |
| 6,073,142 A * | 6/2000 | Geiger et al. | ............... | 715/500 |
| 6,092,101 A * | 7/2000 | Birrell et al. | ................ | 709/206 |
| 6,138,149 A * | 10/2000 | Ohmura | ....................... | 709/218 |
| 6,199,061 B1 * | 3/2001 | Blewett et al. | ................ | 707/3 |
| 6,246,669 B1 * | 6/2001 | Chevalier et al. | ........... | 370/238 |
| 6,256,672 B1 * | 7/2001 | Redpath | ...................... | 709/232 |

(Continued)

OTHER PUBLICATIONS vnews: a multicast, multimedia news service with virtual messagesKowalchuk, R.J.; Hilderman, R.J.; Hamilton, H.J.; Computers and Communications, 1996., Conference Proceedings of the 1996 IEEE Fifteenth Annual International Phoenix Conference on , 27-29 Ma.*

(Continued)

Primary Examiner—Thong Vu
(74) Attorney, Agent, or Firm—Thomas, Kayden, Horstmeyer & Risley LLP

(57) ABSTRACT

The present invention provides an e-mail communications system that minimizes the number of duplicate copies of common attachment files to e-mail communications that are stored in the mail store of an e-mail server. When the e-mail server receives an e-mail attachment file that is larger than a threshold size, the server performs a database search for another copy of the attachment file in the mail store. If another copy is located, the system creates a pointer in the mail store that associates the located attachment file with the e-mail for the additional recipient(s). Attachment files are deleted only after the recipients of the associated e-mail communications delete each of the respective e-mails.

13 Claims, 6 Drawing Sheets

U.S. PATENT DOCUMENTS

| | | | |
|---|---|---|---|
| 6,275,848 B1 | 8/2001 | Arnold | 709/206 |
| 6,275,850 B1 * | 8/2001 | Beyda et al. | 709/206 |
| 6,278,449 B1 * | 8/2001 | Sugiarto et al. | 715/826 |
| 6,321,242 B1 * | 11/2001 | Fogg et al. | 715/513 |
| 6,327,594 B1 * | 12/2001 | Van Huben et al. | 707/200 |
| 6,366,949 B1 * | 4/2002 | Hubert | 709/206 |
| 6,405,244 B1 * | 6/2002 | Bando et al. | 709/206 |
| 6,453,340 B1 * | 9/2002 | Emura | 709/206 |
| 6,457,044 B1 * | 9/2002 | IwaZaki | 709/206 |
| 6,463,430 B1 * | 10/2002 | Brady et al. | 707/3 |
| 6,499,001 B1 * | 12/2002 | Meyer | 702/187 |
| 6,505,236 B1 * | 1/2003 | Pollack | 709/206 |
| 6,560,639 B1 * | 5/2003 | Dan et al. | 709/218 |
| 6,606,654 B1 * | 8/2003 | Borman et al. | 709/219 |
| 6,611,830 B1 * | 8/2003 | Shinoda et al. | 707/3 |
| 6,662,212 B1 * | 12/2003 | Chandhok et al. | 709/206 |
| 6,728,733 B1 * | 4/2004 | Tokui | 707/200 |
| 6,728,752 B1 * | 4/2004 | Chen et al. | 709/203 |
| 6,732,111 B1 * | 5/2004 | Brodersen et al. | 707/101 |
| 6,738,800 B1 * | 5/2004 | Aquilon et al. | 709/206 |
| 6,757,712 B1 * | 6/2004 | Bastian et al. | 709/206 |
| 6,772,139 B1 * | 8/2004 | Smith, III | 707/3 |
| 6,801,962 B1 * | 10/2004 | Taniguchi et al. | 710/33 |
| 6,829,636 B1 * | 12/2004 | Kubik et al. | 709/206 |

OTHER PUBLICATIONS

Digital toolbox. Controlling interests [MIME]; Thomas, B.; Internet Computing, IEEE , vol.: 1 , Issue: 4 , Jul.-Aug. 1997.*

Flexible Control of Downloaded Executable Content—Jaeger, Islam, Anand, Prakash, Liedtke (ResearchIndex) ; citeseer.nj.nec.com/jaeger97flexible.html.*

SiteScape for IU Faculty; www.indiana.edu/~ssf/b155.htm.*

Email Protocols : SMTP, MIME, POP & IMAP; www.opus1.com/www/presentations/emailproto.*

WPL MAC Tutorial; users.rcn.com/woblib/mactut.htm.*

Standardization of the Complement Adjunct Distinction—Adam Meyers Catherine (1994) ; nlp.cs.nyu.edu/publication/papers/adj-compl-old.ps.*

On the Semantics of 'Current-Time' In Temporal Databases—Finger (1996) ftp.ime.usp.br/pub/mfinger/SBBD96.ps.gz.*

Kerberos Authentication and Authorization System—Miller, Neuman, Schiller.. (1988) krasse.ce.chalmers.se/Security/techplan.PS.gz.*

How to Use Automatic Formatting to Turn File Names into Hyperlinks www.wellesley.edu/Computing/World/hyperlinks.html.*

Adventure Software—Internet Adventurer—File Attachments; www.inetadv.net/help/newsatt.htm.*

Microsoft Office Developer Forum—Office 97 Programmer's Guide—Microsoft Access Objects; www.microsoft.com/officedev/articles/Opg/003/003.htm.*

Design Specification; cs.wwc.edu/~fortsa/se/designspec.html.*

Initial Use of COTS Tools in the OBJS Virtual Office; www.objs.com/survey/Scenario-1.html.*

Modeling Mobile IP in Mobile UNITY—Peter Mccann (1998) www.cs.wustl.edu/cs/techreports/1998/wucs-98-03.ps.Z.*

* cited by examiner

HEADER DATABASE

| HEADER# | USER NAME | SUBJECT | DATE RECEIVED | FROM | ATTACHMENT |
|---|---|---|---|---|---|
| 1 | gobi 7265 | Funny Joke | 10/31/00 | joe@anyisp.com | ✓ 3 |
| 2 | mody 6380 | Hysterical Email! | 10/27/00 | synth@izewr.com | |
| 3 | gore 7923 | Political Announcement | 9/9/00 | clinton@pres.com | |
| 4 | welsh 9929 | Final Report | 3/10/00 | jack@gebc.com | ✓ 2 |
| 5 | larry 3926 | That is Really Funny | 11/2/00 | gobi@7265 | ✓ 3 |
| 6 | johm 9938 | Funny Joke | 10/31/00 | joe@anyisp.com | ✓ 3 |
| 7 | bear 3827 | Meeting Notice | 9/29/00 | raph@auren.com | |
| 8 | bird 2392 | Stars & Stripes | 7/4/00 | uncle@sam.gov | ✓ 6 |

*FIG. 4*

| CACHED ATTACHMENT FILE STORAGE DATABASE | | | | | | | | | | | | |
|---|---|---|---|---|---|---|---|---|---|---|---|---|
| HEADER # | LINK No. | FILE TYPE | TITLE | SIZE | Ms-DOS NAME | SOFTWARE | VERSION | AUTHOR | CREATION DATE | LAST MODIFIED | REVISION | PAGES | CHARTERED DESIGN |
| 2 | 1 | TEXT | FUNNY JOKE | 1MB | FUNNY.WPD | WORDPERFECT | 6.0 | JOHNSON | 11/01/00 | 11/03/00 | 3 | 18 | 9273 | - |
| 4 | 2 | TEXT | REPORT | 0.MB | REPORT.DOC | WORD | 99 | WELCH | 9/22/99 | 3/9/00 | 9 | 205 | 998625 | - |
| 1,5,6 | 3 | VIDEO | WHASSUP | 2-3 MB | WHASSUP.AU | REAL AUDIO | 2.0 | SPIKE | 10/6/00 | 10/6/00 | - | - | - | - |
| 11 | 4 | PRE-SENT-ATION | DC | 5MB | DCPRESNT.PWR | POWERPOINT | 98 | WILLIAM | 9/9/99 | - | - | - | - | SLIDES |
| | | | | | | | | | | | | | | |

| MAIN ATTACHMENT FILE STORAGE DATABASE | | | | | | | | | | | | |
|---|---|---|---|---|---|---|---|---|---|---|---|---|
| HEADER # | LINK No. | FILE TYPE | TITLE | SIZE | Ms-DOS NAME | SOFTWARE | VERSION | AUTHOR | CREATION DATE | LAST MODIFIED | REVISION | PAGES | CHARTERED DESIGN |
| 10 | VIDEO | EXER-CISE VIDEO | EXERCISE.AV | 2MB | EXERCISE.QV | WINDOWS MEDIA PLAYER | 98 | MIKE | - | - | - | - | - | - |
| 8 | MUSIC | STARS & STRIPES | STSTR.AV | 1MB | STSTR.AV | REAL AUDIO | 2 | - | - | - | - | - | - | - |
| 16 | TAX | HELLO | LETTER.DOC | 0.2MB | LETTER.DOC | WORD | 98 | BIRD | 9/8/99 | 10/9/00 | 16 | 3 | 987 | - |

*FIG. 5*

METHOD AND APPARATUS FOR MINIMIZING STORAGE OF COMMON ATTACHMENT FILES IN AN E-MAIL COMMUNICATIONS SERVER

FIELD OF THE INVENTION

The present invention relates to the storage and maintenance of e-mail attachment files in an e-mail communications server, and more particularly, to a method and apparatus for reducing the number of copies of identical attachment files stored in the e-mail communications server.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

E-mail application programs are typically configured for generating messages in the form of memoranda. An e-mail application user interface guides a user to "compose" an e-mail communication by providing a platform for entering at least one outgoing e-mail address, a "subject" heading, and a "body" for the actual message. The user may also designate a document, file or executable program to be attached to the e-mail message. When the user completes typing the message and presses the "send" key, the message is transmitted over the network and is routed for delivery to an e-mail server corresponding to the provided destination address.

A known e-mail communications system and a method for transmitting e-mail communications between networks over the Internet are described with reference to FIG. 1. Computers 10a–10c are connected through a local area network (LAN) 11 to e-mail communications system 12, which can send e-mail communications to any of computers 18a–18c through e-mail communications system 16 and local area network (LAN) 17. E-mail communications systems 12 and 16 include Mail Transport Agent (MTA) servers 12a, 16a, Post Office Protocol (POP or POP3) servers 12b, 16b, and Message Store 12c, 16c. The e-mail communications servers 12 and 16 are also connected to their respective domain name servers (DNS) 13, 15.

When an e-mail communication is transmitted according to the Simple Mail Transport Protocol (SMTP), it is first divided into three components: the sender's "mail from:" address; the recipient address list; and the data portion of the message. After a user of computer 10c prepares an e-mail communication and sends the e-mail across the LAN 11, it is sent to the MTA 12a, which accepts e-mails for delivery. The MTA then separates the address information from the data portion of the e-mail. The MTA parses the envelope to determine whether to route the message to an external network or store the message in Message Store 12c for access by another computer connected to the LAN 11. The MTA "postmarks" the e-mail by adding routing data to the header before storing the message.

If the e-mail is to be sent to another user on a different mail system, the MTA 12 next determines the domain for the intended recipient through its DNS 13, which queries the recipient system's DNS 15 through the Internet. Upon receiving the domain information, MTA 12a transmits the e-mail communication to MTA 16b, which is waiting to accept e-mail. MTA 16b then stores the received e-mail in Message Store 16c. Later, a user on computer 18a can log in to the e-mail system and connect to the POP server 16a, which determines if there is new mail to download. POP server 16a can then retrieve the e-mail communication from the Message Store 16c and transmit the e-mail through the LAN 17 to the user.

It is common for users to send a single e-mail communication to multiple recipients. This typically occurs when the e-mail communication contains a humorous joke or anecdote, a political announcement or notice, an advertisement, or pertains to any other subject matter that is of common interest. Some of the recipients may in turn forward this e-mail communication to other groups of recipients. In some instances, a single e-mail communication ultimately may be transmitted and forwarded to thousands of recipients, and, through different sources, some users may even receive multiple copies of the same e-mail communication. Such e-mail communications may additionally include large attachment files stored along with the e-mail message.

When an e-mail communication is transmitted to a plurality of recipients who are connected to the same e-mail communications server, only a single copy of the e-mail communication message and attachment is stored in the Mail Storage of the e-mail server. For example, if a prospective vendor sends a solicitation via e-mail to a large group of employees in a single company, the company's e-mail server will store only a single copy of the e-mail solicitation. The e-mail message and attachment will remain in the Mail Storage until it is designated for deletion by each of the recipients. Consolidating storage of e-mail communications in this manner can reduce the amount of memory required in the company's e-mail communications server.

Although presently available e-mail communications systems consolidate storage when an e-mail communication transmitted by a single sender is received for distribution to a plurality of recipients in a common e-mail server, such e-mail systems do not consolidate storage of the e-mail communication file when it is forwarded to others in the network, resulting in multiple copies of the same file(s). Likewise, if a common e-mail communication is separately transmitted to multiple recipients in a network, or is transmitted multiple times to a single recipient, the e-mail system retains multiple copies of the same file(s) in Mail Storage. This duplication of file storage reduces the efficiency of the e-mail communications server.

SUMMARY OF THE INVENTION

In view of the difficulties described above regarding the duplication of storage of common e-mail communications in an e-mail server, there is a need for a method and apparatus for automatically detecting and consolidating storage of common e-mail attachment files received in an e-mail communications server.

An object of the present invention is to provide a method of storing an e-mail communication containing an attachment file received in an e-mail server. A database of attachment files previously stored in the e-mail server is searched for a copy of the attachment file from the received e-mail communication. If a copy of the attachment file is located in the e-mail server, the attachment file from the e-mail communication is removed, and a link is created from the e-mail communication to the previously stored attachment file in the database.

Another object of the present invention is to provide a method of storing attachment files to e-mail communications received in an e-mail server. Header information from the e-mail communications is extracted and stored in a mail store. Header information from the attachment file to be stored is also extracted. The extracted attachment file header information is compared with header information from attachment files previously stored in the mail store to determine whether the attachment files received with the e-mail communications are duplicates of previously stored files. If an attachment file is a duplicate, a link is stored in the mail store between the e-mail header information and the previously stored attachment file.

Yet another object of the present invention is to provide an e-mail communications server. An MTA server receives e-mail communications from an external network. A mail store stores e-mail communications received by the MTA server. A POP server downloads e-mail communications from the mail store to client computers through an internal network. E-mail attachment file checking software determines whether attachment files in received e-mail communications are duplicates of attachment files in the mail store. The mail store then removes duplicate attachment files from e-mail communications and creates links from received e-mail communications to the corresponding attachment files in the mail store.

BRIEF DESCRIPTION OF THE DRAWINGS

FIG. 4 is a table of an exemplary header database in the e-mail communications server of FIG. 2.

FIG. 5 is a table of an exemplary attachment file database in the e-mail communications server of FIG. 2.

DETAILED DESCRIPTION OF THE PREFERRED EMBODIMENTS

The present invention provides an e-mail communications system that minimizes the number of duplicate copies of common attachment files to e-mail communications that are stored in the mail store of an e-mail server. When the e-mail server receives an e-mail attachment file that is larger than a threshold size, the server performs a database search for another copy of the attachment file in the mail store. If another copy is located, the system creates a pointer in the mail store that associates the located attachment file with the e-mail for the additional recipient(s). An attachment file is deleted only after all e-mail communications that include the attachment file are deleted.

Figure 1:
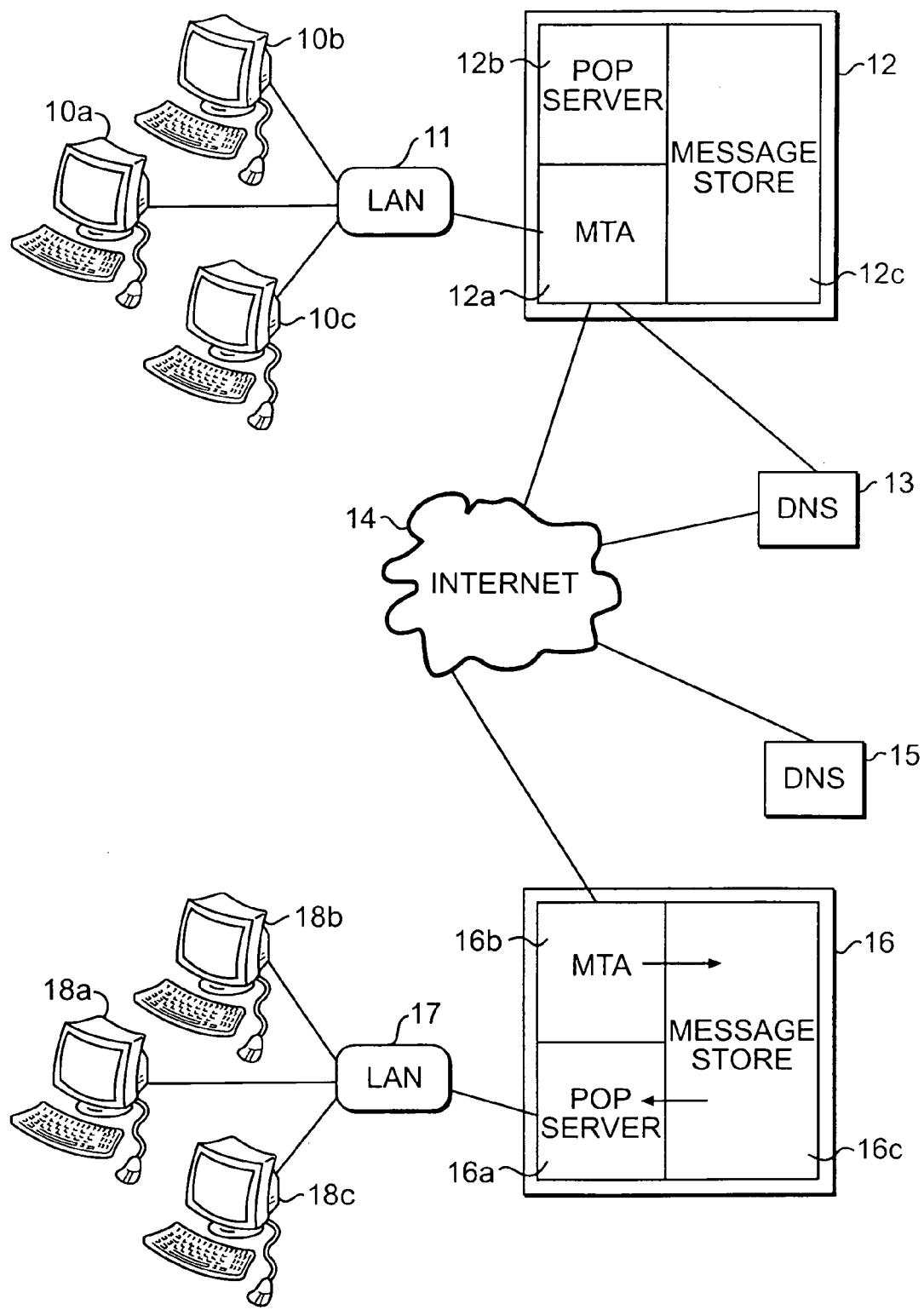
FIG. 1 is a schematic diagram of a known e-mail communications and computer network system.
Figure 2:
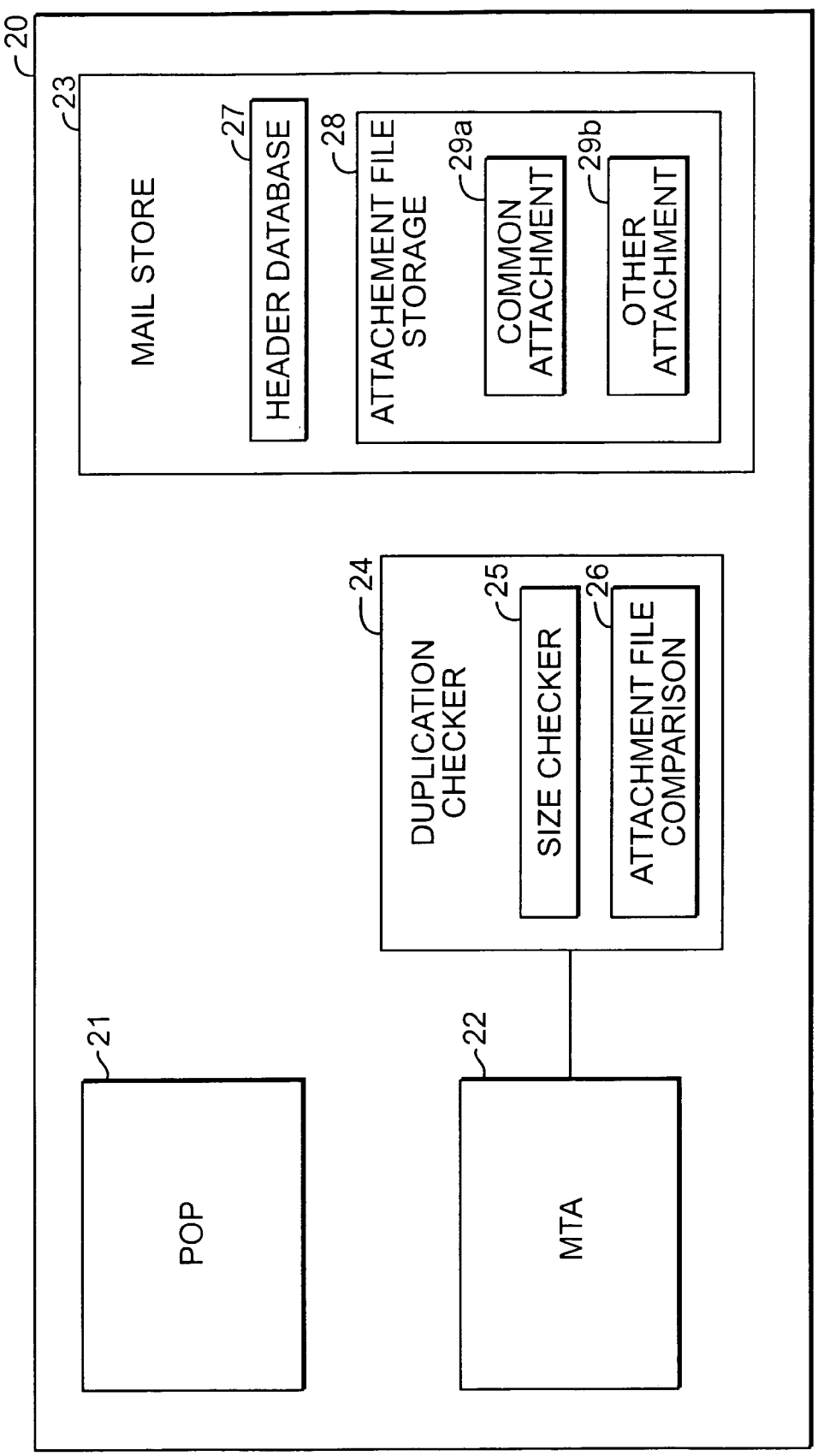
FIG. 2 is a schematic diagram of an e-mail communications server according to a preferred embodiment of the present invention.

The present invention will now be described in more detail with reference to the figures. FIG. 2 is a schematic diagram of an e-mail communications server 20 in accordance with a preferred embodiment of the present invention. E-mail server 20 includes an MTA server 22 for transmitting and receiving e-mails, a mail store 23 for storing e-mail communications prior to downloading by a recipient client, and a POP server 21 for forwarding e-mail communications from the mail store 23 to recipient clients. In the present invention, e-mail server 20 additionally includes a duplication checker 24, which intercepts e-mail communication files prior to storage in mail store 23. The duplication checker 24 contains size checker software 25 that determines the size of e-mail attachments to be stored in the mail store 23, and file comparison software 26 for detecting whether large e-mail attachment files that are to be stored are duplicate copies of previously-stored e-mail attachment files.

Mail store 23 contains an attachment file storage database 28 for storing attachment files from e-mail communications received from the MTA 22. The attachment files are stored separately from the corresponding e-mail header information and message, which are maintained in a header database 27. For each e-mail communication received by the MTA 22 that includes at least one attachment file, the header database 27 stores at least one link to the corresponding attachment file(s) in the attachment file storage database 28. As explained in further detail below, detected attachment files that are referenced by multiple e-mail communications are stored in a common attachment section 29a, separate from the storage of other attachment files 29b. Much like a cache, the common attachment section 29a stores files that are accessed more frequently in the attachment file database 28.

Figure 3:
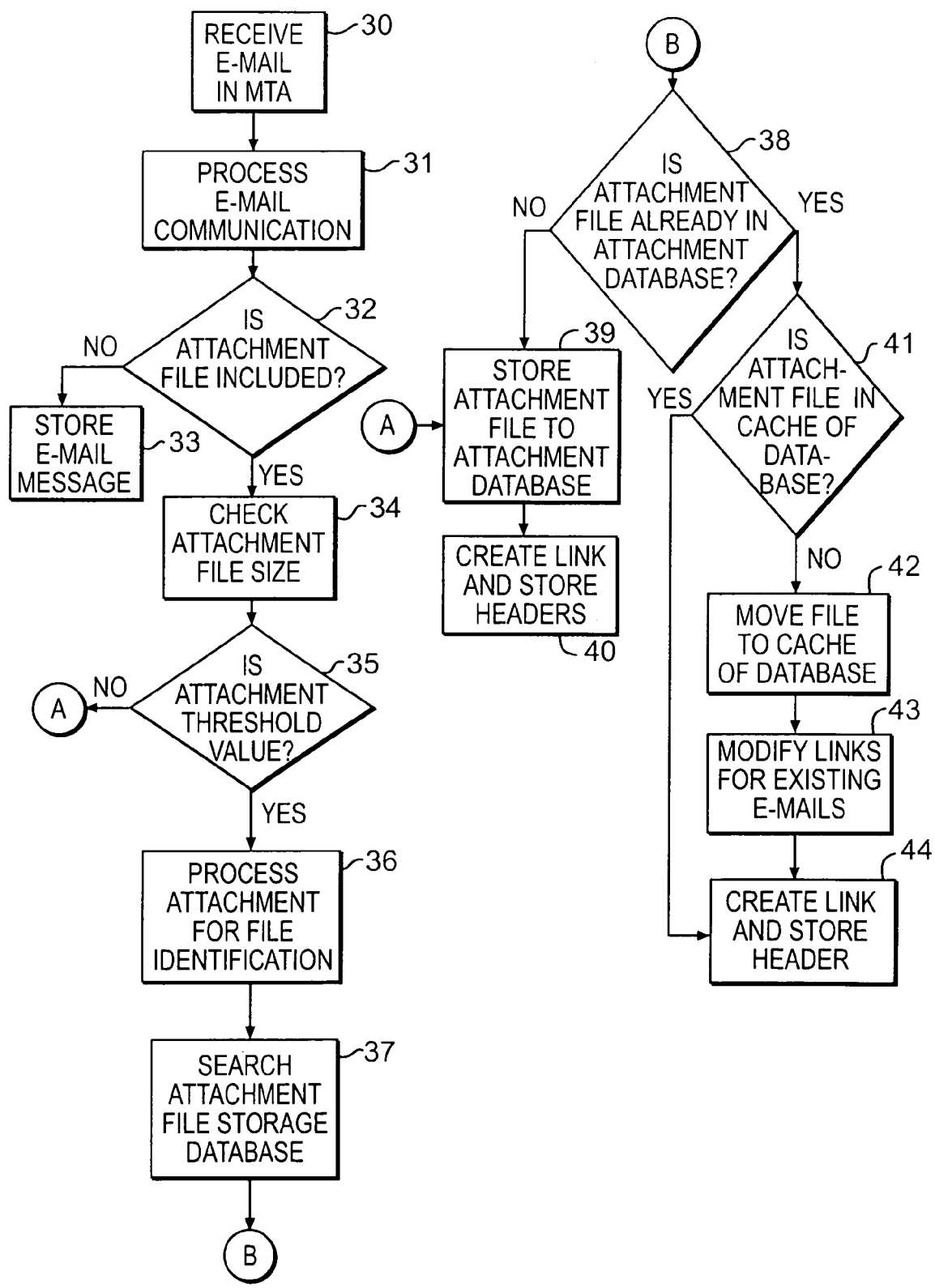
FIG. 3 is a flow diagram for storing storing an attachment file in the e-mail communications server of the preferred embodiment of the present invention of FIG. 2.

FIG. 3 shows a method for storing e-mail attachment files in the mail store according to the preferred embodiment. When an e-mail communication is received in the MTA server in step 30, the MTA server processes the e-mail communication in step 31 to separate the header file from the e-mail message data and e-mail attachment file data, if present. If the MTA server determines in step 32 that no attachment file is included in the e-mail communication, the e-mail message is stored in step 33 in the mail store. The e-mail message may be stored in any conventional manner in the mail store. The mail store may be configured such that the e-mail header and message are stored in header database 27, without a link to the attachment file storage database. Alternatively, the header of the e-mail message can be stored in header database 27 with a link to the e-mail message data, which may be stored in another e-mail database in the mail store (not shown in FIG. 2). As a further alternative, the e-mail header and message data may be stored together in the e-mail database without any link in the header database 27.

If the MTA server determines in step 32 that an attachment file is included in the e-mail communication, the size checker software 25 in the duplication checker 24 determines the attachment file size in step 34. If it is determined in step 35 that the attachment file is not greater than a threshold size, the mail store in step 39 stores the header and message information (depending upon configuration) in the header database 27. In step 40, the attachment file is then stored in the main section 29b of the attachments file storage database 28. A link is created in the header database from the header to the stored attachment file. In the e-mail server 20 of the preferred embodiment, all attachment files, regardless of size, are stored in the attachment file storage database, and the header database 27 creates a link from the corresponding e-mail header to the attachment. In the alternative embodiment in which the e-mail message is stored in an e-mail database in the mail store 23, the attachment file may also be stored in the e-mail database together with the e-mail message.

The duplication checker of the preferred embodiment is configured to reduce the number of duplicate attachment files that are greater than a certain, predetermined threshold size. As will be described, the steps of processing the attachment file prior to storage, searching the attachment file database for duplicates, and moving files from the main section 29b to the cached common attachments portion 29a of the attachment files database are time intensive. Attachment files of a relatively small size, such as those below 50 KB, do not occupy significant space in the attachment file storage database, even if multiple copies have been received and stored therein. Therefore, attachments that are relatively small text files, such as short letters or memoranda, are not searched for duplicates. In contrast, large attachment files, such as those above 1 MB (or any other predetermined threshold), can require significant resources when multiple copies are stored in the e-mail server. An inordinate number of duplicates of large attachment files stored in the e-mail server may overfill the server, such that the e-mail communications server will cease operating until files are deleted. For this reason, information systems managers who operate conventional e-mail communications systems caution users to promptly delete large e-mails and discourage others from sending e-mails with large attachment files to the e-mail server.

If, in step 35, size checker 25 in the e-mail server 20 determines that an e-mail attachment in a received e-mail communication is greater than a threshold size, the duplication checker 24 next processes the attachment file in step 36 to generate file identification information. As will be described in further detail below, this can be performed by any of several methods, such as a checksum determination, or extraction of certain attachment file header information. The processing step generates information by which the attachment file comparison section 26 of the duplication checker 24 can search the attachment file storage database 28 for identical attachment files, in step 37.

If the duplication checker determines, in step 38, that there are no copies of the attachment file previously stored in the mail store 23, then the mail store stores the attachment file in the main section 29b in step 39, and creates a record in the header database and a link in the record from the attachments database to the header database, in step 40.

If the duplication checker locates another copy of the attachment file, the mail store 23 checks in step 41 if the attachment file is presently stored in the cache portion 29a of the attachment file storage database 28. However, if the duplication checker determines that the attachment file is in the cache portion 29a, then the attachment file is already associated with a plurality of e-mail communications. In that case, the mail store creates a link in the record of the header database to the attachment in the cache portion 29a in step 44.

If the attachment file is not presently in the cache portion 29a, then the attachment file has thus far been associated with only a single e-mail communication. In step 42, the attachment file is transferred from main section of the database 29b to the cache portion 29a. The links in the record of the other, previously stored e-mail communication associated with the attachment file is modified to reflect the change in storage location in step 43. The mail store then creates a link in the record of the header database to the attachment in the cache portion 29a in step 44.

In the preferred embodiment, as shown in FIG. 3, the mail store 38 places an attachment file in the cache portion of the attachment file storage database 28 only when there are a plurality of e-mail communications received that contain an identical attachment file. In some e-mail communications systems, when a sender transmits a single e-mail communication to a plurality of recipients on the same e-mail server, the MTA in the e-mail server receives a single e-mail with a plurality of recipient addresses in the header. For such systems, the mail store 23 can be configured to check, after determining in step 38 that there is not an attachment file already in the database, whether the header of the received e-mail communication contains a plurality of recipients who are on the e-mail server. In such case, the mail store will create a pointer in step 41 and store the attachment file in the cache portion of the database in step 43.

The process of searching the attachment file storage database 37 for a duplicate of the attachment file to be stored in the mail store indicated by step 37 of FIG. 3 can be performed by a variety of methods, according to the type of information process for file identification in step 36. Although the most accurate method for determining whether a duplicate file exists in the attachment file database is to perform a bit-by-bit comparison of each file stored in the database with the file to be stored, such a test would be unduly time consuming and would adversely affect the operability of the e-mail system. A more efficient method to identify the attachment files is to compare the characteristics concerning the files, rather than the actual file data itself.

According to the preferred embodiment, the duplication checker 24 first identifies the type of file that is to be stored as an attachment to an e-mail communication. For example, an attachment file may be a text, spreadsheet, graphics, picture, audio, or video file. By searching first according to the type of file, the duplication checker can immediately eliminate the majority of files stored in the mail store from consideration. The duplication checker next identifies the properties associated with the attachment file in the file header, which may include any of: title/name, MS-DOS name, software program, software program version number, author, creation date/time, last modified date/time, size, attributes, last saved by, revision number, and revision time (minutes). In the case of a text document, such as a Microsoft Word™ document, other properties might include the number of sections, pages, paragraphs, lines, words, and characters. A Microsoft PowerPoint™ document may include properties such as the type of fonts used, design template, embedded OLE servers, and slide titles.

The duplication checker searches the properties of each attachment file in the database that is of the same type as the application file in the received e-mail communication. If another attachment file has the identical properties, the attachment file in the received e-mail is identified as being a duplicate.

FIGS. 4 and 5 illustrate an example of the method for storing an attachment file in the mail store. The e-mail server 20 of the preferred embodiment, operating an e-mail system for the domain "anycompany.com," receives an e-mail in the MTA server 22 on Nov. 7, 2000, intended for an employee at the company, Larry Aslad. The MTA server processes the e-mail and identifies the following: the e-mail communication is from debl@anyisp.com; it is to be sent to asla8908@anycompany.com; the subject heading is "This will get you laughing"; the size of the file is 2.03 MB; the e-mail was delivered on Nov. 04, 2000, at 10:22 AM; and the e-mail includes an attachment file. The size of the attachment file is 2.03 MB.

Because the attachment file in the received e-mail communication is greater than the threshold size of 0.5 MB, the duplication checker 24 processes the attachment file in the e-mail communication for file identification. Looking to header of the attachment file, the duplication checker identifies that the attachment is a video file, entitled "Whassup," playable on Real Audio™, version 2.0, created on Oct. 6, 2000, authored by "Spike."

The duplication checker 24 now performs a search of the attachment file database for common attachment files. Searching the cached attachment file of FIG. 5 first, it becomes clear that there is only one video file stored in the cache, link number 3. As indicated by the "header number" field, this file is currently the linked attachment for header numbers 1, 5, and 6.

Comparing this file to the attachment file in the e-mail, it becomes evident that the title, size, software and version, author, and creation date are the same.

Based upon these common properties, it is determined that the attachment file in the e-mail communication for asla8908@anycompany.com is a duplicate. It is worth noting that the subject headings for the e-mails stored as header numbers 1, 5, and 6 are each different, and header number 5 was received on a different date from a different source than headers 1 and 6. The duplicate server and mail store can detect that the attachment files are duplicates by storing the attachment file separately from the corresponding e-mails.

Because the file is already in the cache portion of the database, there is no need to move the attachment file from the main attachment file storage database 29b to the cache 29a. The mail store 23 creates a new link and header record in the header database of FIG. 4. The new header record appears as follows: header no. 9; username asla8908; subject "This will get you laughing;" date received Nov. 7, 2000, and from deb1@anyisp.com. Attachment "3" corresponds to the previously cached storage of the same file in the mail store. In the cached attachment files, header no. 9 is now added to the header number list.

Figure 6:
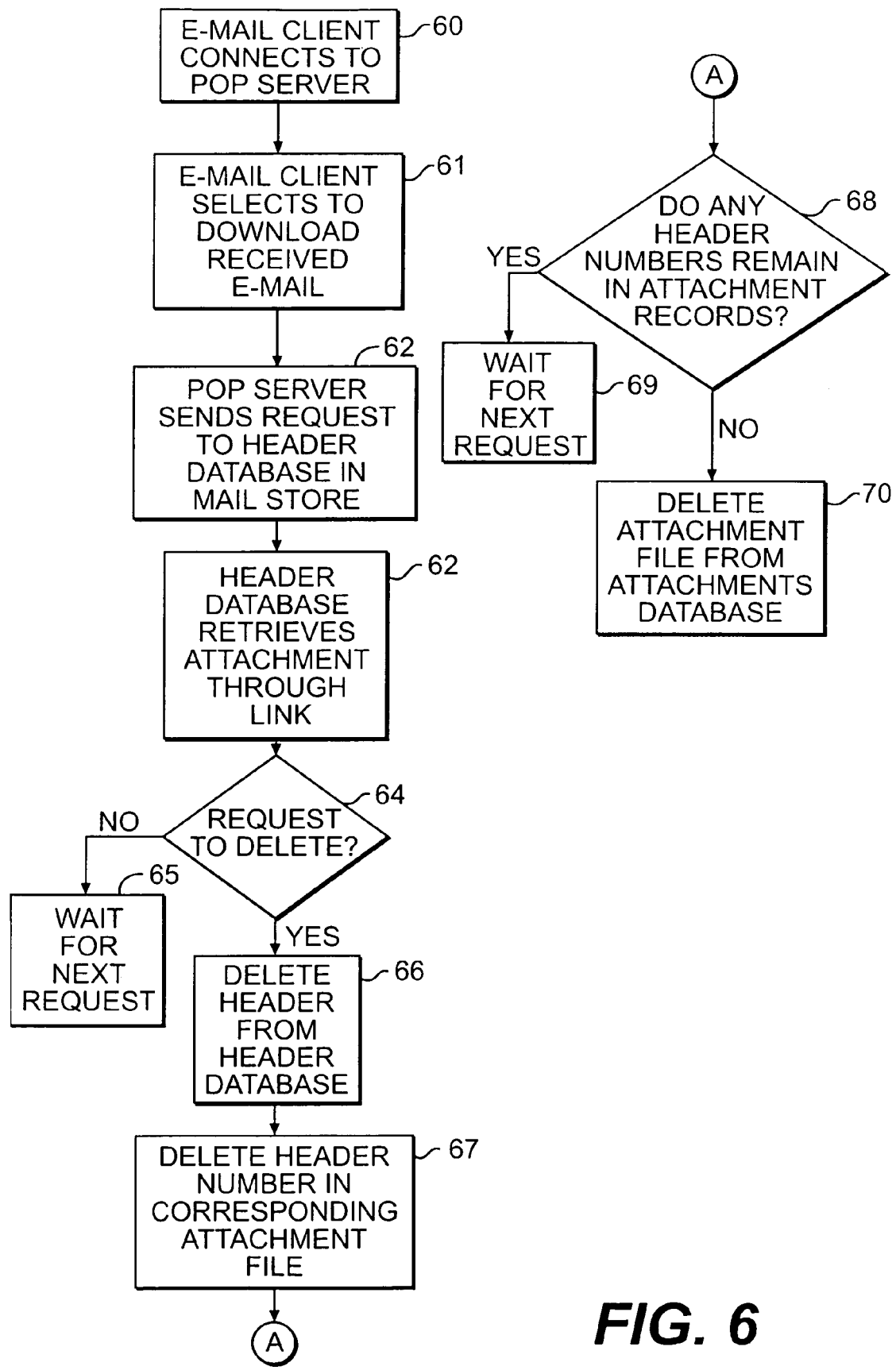
FIG. 6 is a flow diagram for deleting e-mail communications and e-mail attachment files from e-mail communications according to the preferred embodiment of the present invention.

The steps for retrieving e-mail from the e-mail server by a client computer are now described with reference to FIG. 6. An e-mail client connects with POP server 21 in step 60, and selects to download received e-mail in step 61. The POP server then accesses the header database 27 in the mail store in step 62 and extracts the header and e-mail message information from the mail store. In step 63, the mail store retrieves the attachment file corresponding to the requested e-mail communication through the link in the header database to the attachment file storage database 28. The client now can view, reply, forward, copy, or delete the received e-mail message and corresponding attachment file.

If the POP server detects in step 64 that the client requests to delete the e-mail communication, the header in the mail store corresponding to the received e-mail communication is deleted from the header database in step 66. The header reference number is then deleted in step 67 from the corresponding attachment file in the attachment file storage database. The mail store then checks in step 68 if any header reference numbers for the attachment file remain in the attachment database. If all e-mail recipients have deleted the e-mail communication, then the attachment file is deleted from the attachment database, in step 70.

Accordingly, the duplication checker and mail store header and attachment databases of the present invention can minimize storage of duplicate attachment files in an e-mail communications system. The e-mail server of the present invention is configured such that duplicate copies of attachment files are not unnecessarily stored in the mail store, whether the attachment files are received through separate e-mails or e-mail forwarding by users within the same e-mail server network. Thus, it is readily seen that the method and system of the present invention provides for improved and efficient e-mail communications, and saves valuable memory space in the mail store of an e-mail server.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method of storing attachment files to e-mail communications received in an e-mail server, comprising:
    responsive to the e-mail server receiving an e-mail communication containing an attachment file, the e-mail server extracting header information from the e-mail communication and storing the e-mail header information in a mail store;
    the e-mail server extracting attachment file header information from the attachment file contained in the e-mail communication;
    the e-mail server comparing the extracted attachment file header information with attachment file header information from other attachment files previously stored in the mail store to determine whether the attachment files received with the e-mail communications are duplicates of previously stored files;
    if an attachment file is a duplicate, the e-mail server storing a link in the mail store between the e-mail header information and the previously stored attachment file; and
    then the e-mail server removing the attachment file from the e-mail communication.

2. The method of storing attachment files to e-mail communications according to claim 1, further comprising:
    if an attachment file is not a duplicate of a previously stored attachment file, then storing the attachment file in the mail store and storing a link in the mail store between the e-mail header information and the attachment file to the received e-mail communication.

3. The method of storing attachment files to e-mail communications according to claim 2, further comprising:
    deleting the e-mail header information stored in the mail store and the link
    between the e-mail header information and the corresponding attachment file in response to a delete request; and
    deleting the corresponding attachment file if there are no links remaining to the attachment file.

4. The method of storing attachment files to e-mail communications according to claim 1, wherein e-mail messages in the e-mail communications are stored with the corresponding e-mail header information in the mail store.

5. The method of storing attachment files to e-mail communications according to claim 1, wherein the header information extracted from the attachment files includes a designation of file type.

6. The method of storing attachment files to e-mail communications according to claim 5, wherein the step of comparing extracted attachment file header information is performed by searching the previously stored attachment files that are designated as the same file type as the attachment file to the received e-mail communication.

7. The method of storing attachment files to e-mail communications according to claim 5, wherein the header information extracted from the attachment files further includes at least one of: size, creation date, revision date, author, software type, version, and revision number.

8. The method of storing attachment files to e-mail communications according to claim 1, wherein the step of comparing extracted attachment file header information is performed only when the size of the attachment file is greater than a predetermined size.

9. An e-mail communications server comprising:
- an MTA server for receiving e-mail communications from an external network;
- a mail store for storing e-mail communications received by the MTA server;
- a POP server for downloading e-mail communications from the mail store to client computers through an internal network; and
- e-mail attachment file checking software for determining, responsive to the MTA server receiving an e-mail communication containing an attachment file, whether the attachment file in the received e-mail communication is a duplicate of an attachment file that was attached to previously-received e-mail communications in the mail store,
- wherein the mail store removes duplicate attachment files from e-mail communications and creates links from received e-mail communications to the corresponding attachment files in the mail store after the e-mail attachment file checking software determines that the attachment file in the received e-mail communication is a duplicate of an attachment file in the mail store.

10. The e-mail communications server according to claim 9, wherein the mail store further comprises a database for storing the links from received e-mail communications to the attachment files.

11. The e-mail communications server according to claim 10, wherein the mail store further comprises a first attachment storage database for storing attachment files that are each associated with a single e-mail communication, and a second attachment storage database for storing attachment files that are each associated with a plurality of e-mail communications.

12. The e-mail communications server according to claim 9, further comprising e-mail file attachment size checker software for detecting the size of attachment files in received e-mail communications, wherein the e-mail attachment file checking software only checks attachment files that are greater than a predetermined size.

13. The e-mail communications server according to claim 9, wherein the e-mail attachment file checking software extracts properties associated with the attachment files in the received e-mail communications, and searches the mail store for attachment files having the same properties.

* * * * *